US009071657B2

(12) United States Patent
Li et al.

(10) Patent No.: US 9,071,657 B2
(45) Date of Patent: Jun. 30, 2015

(54) METHOD AND SYSTEM FOR IMPLEMENTING INTERNET OF THINGS SERVICE

(75) Inventors: Qin Li, Shenzhen (CN); Gongcai Zhou, Shenzhen (CN); Yaning Song, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 473 days.

(21) Appl. No.: 13/643,005

(22) PCT Filed: Aug. 19, 2010

(86) PCT No.: PCT/CN2010/076145
§ 371 (c)(1),
(2), (4) Date: Oct. 23, 2012

(87) PCT Pub. No.: WO2011/130981
PCT Pub. Date: Oct. 27, 2011

(65) Prior Publication Data
US 2013/0042244 A1    Feb. 14, 2013

(30) Foreign Application Priority Data
Apr. 23, 2010    (CN) .......................... 2010 1 0156911

(51) Int. Cl.
G06F 15/173    (2006.01)
G06F 15/16     (2006.01)
H04L 29/08     (2006.01)
H04W 4/00      (2009.01)

(52) U.S. Cl.
CPC ............... *H04L 67/34* (2013.01); *H04W 4/005* (2013.01); *H04W 4/001* (2013.01)

(58) Field of Classification Search
USPC ........................................................ 709/223
See application file for complete search history.

(56) References Cited

U.S. PATENT DOCUMENTS

2008/0244594 A1*  10/2008  Chen et al. ................... 718/104
2010/0031233 A1*   2/2010  Li et al. ........................ 717/106
(Continued)

FOREIGN PATENT DOCUMENTS

CN    1972296 A      5/2007
CN    101175311 A    5/2008
(Continued)

OTHER PUBLICATIONS

P.R. China, State Intellectual Property Office, International Search Report for International Application No. PCT/CN2010/076145, mailed Jan. 27, 2011.

*Primary Examiner* — Emmanuel L Moise
*Assistant Examiner* — Mahran Abu Roumi
(74) *Attorney, Agent, or Firm* — Bright IP Law Offices

(57) ABSTRACT

Disclosed in the present invention are a method and system for implementing an Internet of Things service. In the present invention: a service generation module generates a description script and a flow script according to a required service, sends the description script and the flow script to an application generation module and a control module, respectively; the application generation module generates an application according to the description script and sends the same to an access module; the access module receives an input of an Internet of Things terminal, processes the input of the Internet of Things terminal using the application, and sends the processed data to a control module; the control module runs the flow script and invokes an execution module to execute an operation according to the data sent by an access module; and the execution module executes an operation according to the invocation of the control module.

13 Claims, 2 Drawing Sheets

(56) References Cited

U.S. PATENT DOCUMENTS

2010/0106697 A1* 4/2010 Enoki et al. .................. 707/704
2011/0161478 A1* 6/2011 Formo et al. ................. 709/223
2014/0258363 A1* 9/2014 Peco et al. ................... 709/202

FOREIGN PATENT DOCUMENTS

| CN | 101533477 A | 9/2009 |
| JP | 2008299414 A | 12/2008 |

* cited by examiner

__US 9,071,657 B2__

METHOD AND SYSTEM FOR IMPLEMENTING INTERNET OF THINGS SERVICE

CROSS REFERENCE TO RELATED APPLICATIONS

This application is the U.S. National Stage of International Patent Application No. PCT/CN2010/076145 filed on Aug. 19, 2010, which claims priority to Chinese Patent Application No. 201010156911.5 filed on Apr. 23, 2010. Both the PCT Application and Chinese Application are hereby incorporated by reference in their entirety.

FIELD OF THE INVENTION

The present invention relates to the field of mobile wireless communication network, and particularly, to a method and system for implementing an Internet of Things service.

BACKGROUND OF THE INVENTION

The Internet of Things is "an Internet of things connected," and there are two meanings: first, the core and basis of the Internet of Things are still the Internet, and it is a network extended on the basis of Internet; second, the user terminals thereof extend to any things to carry out information exchange and communication. Therefore, the definition of the Internet of Things is a network to connect any articles and the Internet to carry out information exchange and communication by way of information sensing devices such as radio frequency identifications (RFID), infrared sensors, global positioning systems, and laser scanners according to an agreed protocol, so as to achieve intelligent identification, positioning, tracking, monitoring and management. In this network, articles can communicate with each other without the intervention of the user, and the essence thereof is to achieve the automatic identification of articles and interconnection and sharing of information by way of a computer Internet using various technologies, and we may say the Internet of Things is a world filled with intelligence. Herein, the "thing" needs to meet the following conditions to be accommodated into the range of Internet of Things: 1. there should be a receiver for corresponding information; 2. there should be a data transmission channel; 3. there should be a certain storage function; 4. there should be a CPU; 5. there should be an operating system; 6. there should be a specific application; 7. there should be a data transmitter; 8. it should follow the communication protocol of the Internet of Things; and 9. there should be a unique serial number which can be identifier in the Internet of Things.

The usage of the Internet of Things is quite wide, ranging from fields such as intelligent traffic, environmental protection, government work, public security, secure household, intelligent fire control, industrial monitoring, older care, personal health, flower planting, water system monitoring, food origination, and enemy inspection, to intelligence collection and so on. The Internet of Things fully applies the New Generation IT technology into various industries, and in particular, the sensors are embedded and equipped into various objects such as power grid, railways, bridges, tunnels, highways, architectures, water supply systems, dams, oil and gas pipelines, and then the Internet of Things is integrated with the existing Internet to achieve the integration of the human society and physical system; in this integrated network, there are central computer groups with super powerful ability which can manage and control the personnel, machine, equipment and facilities in the integrated network in real time, and based on this, the human can manage the production and life in a more delicate and dynamic manner, achieving an "intelligent" state, improving the utilization rate of the resources and the production level, and improving the relationship between human and nature; and undoubtedly, if the Internet of Things era comes, the daily life of the human will be changed greatly.

FIG. 1 is a schematic diagram of the networking of the existing Internet of Things service, and there are the following defects in the application of the current Internet of Things service: 1. there lacks a control center to control the Internet of Things service, which makes it difficult to combine various applications in the Internet of Things service system to provide comprehensive service and achieve comprehensive resource usage and information sharing for various applications, for example, the fire alarm system will make an alarm sound and start the watering apparatus when it detects smog, however, it cannot contact with the external world, such as automatically dialing 119 by triggering the mobile phone of the user; 2. the Internet of Things service is formed once, and the subsequent modification and update is relatively complicated, since when modifying the service, each terminal of the Internet of Things has to be modified, and there are a large number of terminals of the Internet of Things, if one needs to carry out modification, it will be a huge job.

SUMMARY OF THE INVENTION

In view of this, the present invention is to provide a method and system for implementing an Internet of Things service so as to develop a comprehensive Internet of Things service rapidly.

In order to achieve the above object, the technical solution in the present invention is implemented as follows.

Certain embodiment of the invention provides a system for implementing Things of Internet, including: a service generation module, an application generation module, an access module, a control module, and an execution module, wherein the service generation module is used for generating a description script and a procedure script according to a required service, sending the description script to the application generation module, and sending the procedure script to the control module;

the application generation module is used for generating an application according to the description script and sending the same to the access module;

the access module is used for receiving an input of an Internet of Things terminal, processing the input of the Internet of Things terminal using the application, and sending the processed data to the control module;

the control module is used for running the flow script and calling the execution module to execute an operation according to the data provided by the access module; and the execution module is used for execution an operation according to an invocation by the control module.

Preferably, the above system further comprises:

an application management module connected to the application generation module and the access module, respectively, for receiving the application generated by the application generation module, managing the application, and providing the application to the access module.

Preferably, in the above system, the access module is further used for sending a registration request to the application management module and storing an authentication code and an identifier (ID) allocated by the application management module; and the application management module is further used for registering the access module and allocating the authentication code and the ID to the registered access module.

Preferably, in the above system, the access module is further used for requesting the application management module to operate the authentication code based on the authentication code, and/or, requesting to download/upgrade the application; and the application management module is further used for verifying the access module according to the authentication code, and operating the authentication code after the verification is passed, and/or, allowing the access module to download/upgrade the application.

Preferably, in the above syste, the application management module providing the application to the access module further includes: segmenting the application into a plurality of binary files and allocating serial numbers to the binary files sequentially; and the access module is further used for ranking the received binary files according to the serial numbers and assembling the same into a complete file to obtain the application.

Certain embodiment of the invention also provides a method for implementing an Internet of Things service, including:

an application generation module generating an application according to a description script generated by a service generation module and sending the same to an access module;

the access module receiving an input of a terminal of the Internet of Things, processing the input of the terminal of the Internet of Things using the application, and sending the processed data to a control module; and the control module running a flow script generated by the service generation module and calling an execution module to execute an operation according to the data sent by the access module.

Preferably, before sending the same to the access module, the method further comprises:

the application management module receiving the application generated by the application generation module and managing the application;

the access modules sending a registration request to the application management module;

the application management module registering the access module and allocating an authentication code and an ID to the registered access module;

the access module storing the authentication code and ID allocated by the application management module; and the application management module providing the application to the access module.

Preferably, the above method further comprises:

the access module requesting the application management module to operate the authentication code based on the authentication code, and/or, requesting to download/upgrade the application; and the application management module verifying the access module according to the authentication code, and operating the authentication code after the verification is passed, and/or, allowing the access module to download/upgrade the application.

Preferably, before the application generation module generates an application according to a description script generated by a service generation module, the method further comprises:

the service generation module generating a description script and a flow script according to a required service, sending the description script to the application generation module, and sending the flow script to the control module; and the flow script is used for describing a service flow, and the description script is used for describing the application ability of the service.

Preferably, in the above method, the application generation module generating an application according to a description script generated by a service generation module includes:

the application generation module performs grammatical analysis of the description script sent by the service generation module, generates an executable code according to a configuration, and invokes a complier to compile the code to obtain an application.

Preferably, in the above method, the application management module providing the application to the access module includes: segmenting the application into a plurality of binary files and allocating serial numbers to the binary files sequentially; and before processing the input of the Internet of Things terminal using the application, the method further comprises: ranking the received binary files according to the serial numbers and assembling the same into a complete file to obtain the application.

Preferably, in the above method, the application management module managing the application comprises:

the application management module receiving the application sent by the application generation module, allocating a serial number to the application, adding the function instruction of the application, and managing the application based on the serial number.

Preferably, the method and system for implementing an Internet of Things service provided by certain embodiment of the invention make the best of the resources of the Internet of Things, formulate a flow script of the Internet of Things service briefly, can automatically create an application, uniformly receive the input of an Internet of Things terminal using an access module, rapidly deploy the running of the Internet of Things service by controlling the flow by a control module, making the modules in the system able to work in a coordinate way, a comprehensive Internet of Things service can be developed rapidly, improving market competition and having significant economic benefits and social benefits.

Since the control module carries out full monitoring on the flow of the Internet of Things service, the security of the Internet of Things service is ensure; and at the same time, since the control module is only responsible for controlling the information and not executing the Internet of Things service, the load on the control module of the Internet of Things will not be over large.

DETAILED DESCRIPTION OF EMBODIMENTS

Certain embodiment of the invention provides a method and system for implementing an Internet of Things service, and the basic concept thereof includes: a service generation module generates a description script and a flow script according to a required service, sends the description script to the application generation module, and sends the flow script to the control module; an application generation module generates an application according to the description script and sends the same to the access module; the access module receives an input of an Internet of Things terminal, processes the input of the Internet of Things terminal using the application, and sends the processed data to a control module; the control module runs the flow script and calls an execution module to execute an operation according to the data sent by an access module.

Hereinafter, the present invention will be described in detail in conjunction with the accompanying drawings and particular embodiments.

Figure 1:
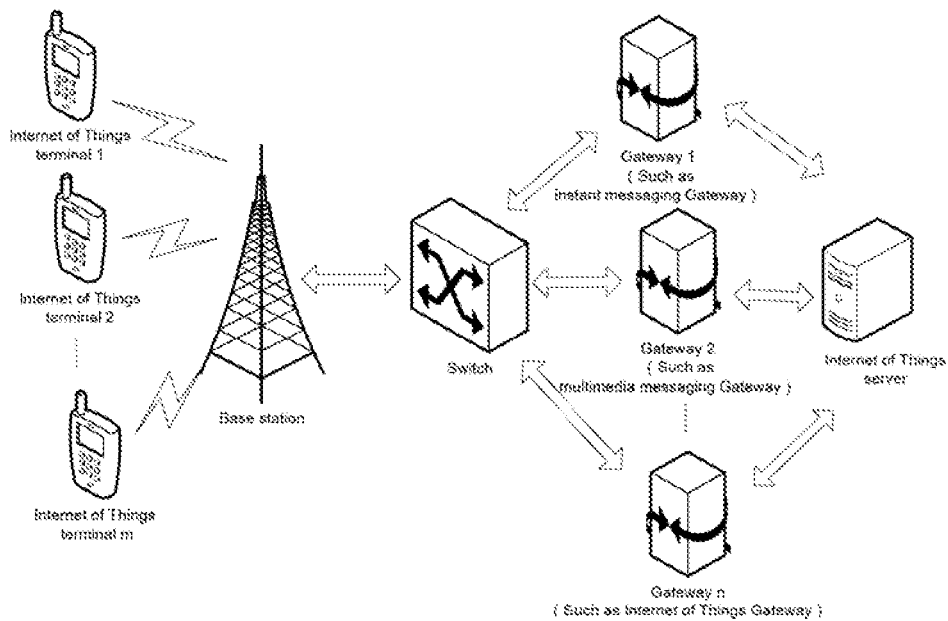
FIG. 1 is a schematic diagram of the networking of an Internet of Things service in the related art.
Figure 2:
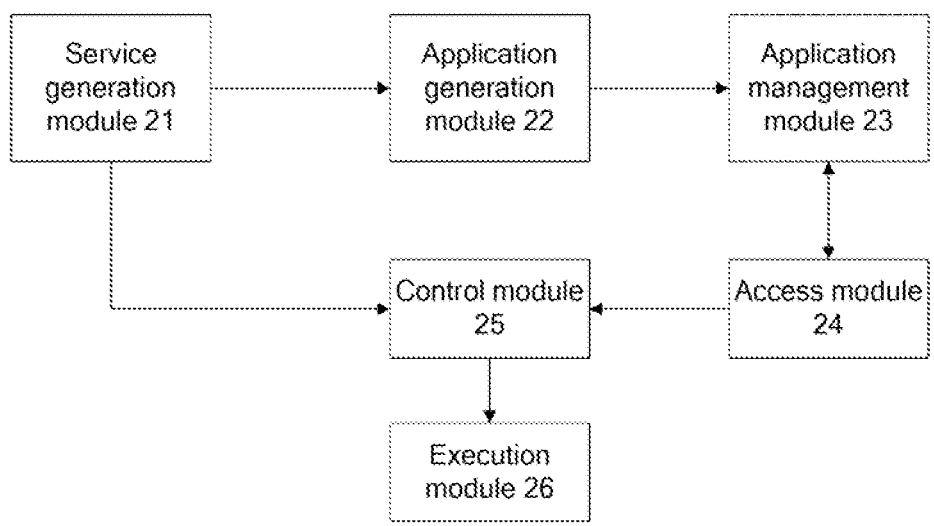
FIG. 2 is a structural schematic diagram of a system implementing an Internet of Things service in the embodiments of certain embodiment of the invention.

Certain embodiment of the invention provides a system for implementing an Internet of Things service, and FIG. 2 is a structural schematic diagram of a system for implementing an Internet of Things service in the embodiments of certain embodiment of the invention, as shown in FIG. 2, the system includes: a service generation module 21, an application generation module 22, an access module 24, a control module 25, and an execution module 26, wherein the service generation module 21 is used for generating a description script and a flow script and sending the same to the application generation module 22 and control module 25 respectively, with the flow script being used for describing service flow and the content thereof being the information about the script itself, which information includes the code of the service flow, the name of the service flow, the service provider of the service flow, and the description script being used for describing the service ability of the service;

the application generation module 22 is used for generating an application according to a description script generated by the service generation module 21 and sending the same to the access module 24;

the access module 24 is used for receiving an input of an Internet of Things terminal, processing the input of the Internet of Things terminal using the application, and sending the processed data to the control module 25;

the control module 25 is used for running the flow script sent by the service generation module 21 and calling the execution module 26 to execute an operation according to the data provided by the access module 24; and the execution module 26 is used for executing an operation according to an invocation by the control module 25; in a set of systems, there can be a plurality of execution modules according to the application of the Internet of Things service for executing different operations according to an invocation by the control module 25; for example, as to the application of monitoring area temperature, there are the following execution modules: an execution module for starting the air conditioner, an execution module for alarming the administrator, and an execution module for the alarm to alarm.

Preferably, the system further comprises:

an application management module 23 connected to the application generation module 22 and access module 24 respectively for receiving the application generated by the application generation module 22, managing the application, and providing the application to the access module 24.

Preferably, the application management module 23 further for registering the access module 24.

Preferably, the processing on the application by the application management module 23 further includes: the application management module 23 receives the application provided by the application generation module 22, allocates a serial number to the application, adds information such as a function instruction of the application, and segments the application into a plurality of small files according to the size of the application, with the files being binary files.

Preferably, the application management module 23 registering the access module 24 further includes: the application management module 23 receives a registration request from the access module 24, registers the access module 24, and allocating an authentication code and an identifier (ID) to the registered access module 24.

The application management module 23 registering the access module 24 further includes: the application management module 23 receives a registration request from the access module 24, registers the access module 24, and allocating an authentication code and an identifier (ID) to the registered access module 24.

The access module 24 may receive a plurality of files, assembles the plurality of files into an integrated application, and stores the authentication code and the ID allocated by the application management module 23; the access module 24 interacts with the application management module 23 using the authentication code, and after the authentication code passes the verification, the application management module 23 deletes/modifies the authentication code and prolongs the service life of the authentication code, and the access module 24 can download an application from the application management module 23 and upgrade the application; the access module 24 processes the input of the Internet of Things terminal using the application and sends the processed data to the control module 25; if the authentication code of the access module 24 passes the verification of the application management module 23 and the application management module 23 is requested to delete the authentication code, and the application management module 23 directly deletes the authentication code of this access module 24, and if the access module 24 requests the application management module 23 to modify the authentication code, then the application management module 23 re-allocates an authentication code to the access module 24, sends the new authentication code to the access module 24, and at the same time, the application management module 23 updates the old authentication code.

In the present invention, the operating environments of various modules may be various operating systems, such as Windows operating system, Linux operating system, etc.

Figure 3:
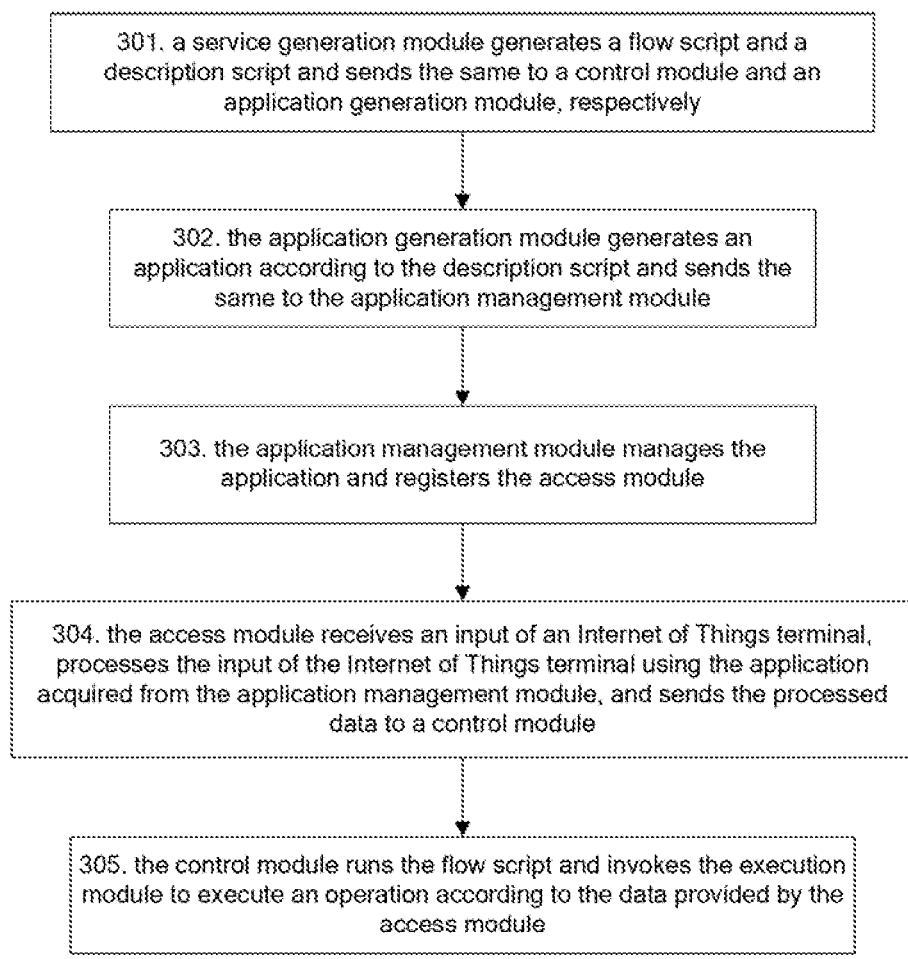
FIG. 3 is a schematic flowchart of a method for implementing an Internet of Things service in the embodiments of certain embodiment of the invention.

Certain embodiment of the invention provides a method for implementing an Internet of Things service, and FIG. 3 is a schematic flowchart of a method for implementing an Internet of Things service in the embodiments of certain embodiment of the invention, as shown in FIG. 3, the thud includes the following steps:

Step 301: a service generation module generates a flow script and a description script and sends the same to a control module and an application generation module respectively.

In particular, the service generation module generates a flow script and a description script and sends the flow script to the control module, with the flow script being used for describing service flow and the content thereof being the information about the script itself, such as the code of the service flow, the name of the service flow, and the service provider of the service flow: for example, for an application of monitoring the temperature of an area, the flow script needs to run periodically, the period of this script is set as 5 minutes, and this script runs every day;

the control modules provides various application abilities and algorithms, in the situation where the actual application of the service is fully taken into account, the application abilities and algorithms provided by the control module are described by a script, which script is the description script and is provided to the application generation module for describing the application ability of the service, including accessing the database, positioning, short message, multimedia message, and image processing, etc.; for example, an application of monitoring the temperature of an area needs to have four application abilities, which are the application ability of acquiring the temperature, the application ability of starting the air conditioner, the application ability of alerting the administrator, and the application ability of the alarm to sound the alarm, respectively;

in this embodiment, the flow script and description script are extensible markup language (XML) scripts; the control module abstracts the application abilities of the service as various XML labels, with each label corresponding to an icon for providing a visualized module; a label is a description of the application ability, one application ability corresponds to a label, there are attributes in the label, with each attribute corresponding to a code, for example, the database access application label is <Database ip=10.130.72.144 user=user password=pass\>, which indicates that the control module needs to access the database and indicates the address, user and password that the control module accesses, and these labels are preset; an icon is used for generating a flow script conveniently and briefly, for example, the database application ability can correspond to an icon, the icon is put into the service generation module, if the icon is clicked, a dialogue box will be pop up, the attributes of the database application ability can be inputted therein, such as ip, user, password; the icon corresponds to class, the class is stored in the system memory; the elements in the class correspond to the values of the attributes in the label; after the values of the attributes in the label are assigned to the elements in the class, the control module can read the flow script; and when generating a flow script, a flow script can be generated on the basis of the control sentences provided by the control module in combination with the icons corresponding to various XML labels;

after the flow script and description script are generated, the service generation module automatically packages these two scripts into compression files and sends the same to the control module and application generation module, respectively, via the provided web interface; since the flows of the method in certain embodiment of the invention are based on the two scripts generated in this step, when it is required to re-formulate an Internet of Things service or modify the formed Internet of Things service, it only needs to re-formulate the flow script and description script in this step or modify the flow script and description script without the need to reconfigure each module in the system, Step 302: the application generation module generates an application according to the description script and sends the same to the application management module.

In particular, the application generation module receives the description script sent by the service generation module, since the control module can provide many fixed control sentences, application abilities, algorithms, and grammars, the control sentences and algorithms are embodied by classes and the corresponding codes are provided for implementation, the application generation module reads out the codes of the attributes of the label in the description script and generates codes operable in the operating system according to the configuration, and under this operating system, the application generation module calls the compiler of the operating system to compile the codes to obtain the application, and the application generation module sends the application to the application management module; the configuration is to designate the type of the operating system to be run by the application.

Step 303: the application management module manages the application and registers the access module.

In particular, the application management module receives the application generated by the application generation module, allocates a serial number to the application, and adds information such as function instruction of the application; the function instruction of the application makes it convenient for the application management module to manage the application and makes it convenient for the user to view the function of the application; the serial number allocated to the application makes it convenient for the application management module to manage the application, and after the application management module generates a new application, the serial number and function instruction corresponding to this application will be stored into an application list; during practical application, the application management module sends the application to the access module via a multimedia message, the size of the application usually exceeds the size of the affix which can be carried by the multimedia message, therefore, the application is segmented into a plurality of small files according to the size of the application, and in this embodiment, the file is a binary file; the themes of the plurality of small files of the same application are the same, the serial numbers of the plurality of small files are different, which serial number is composed of two parts: one part is the serial number of the application where the file is located, and the other part is the serial number of the file; and the serial number of the file is allocated to the file by the application management module according to the order of the segmented files when segmenting the application;

the application management module receives the registration request of the access module via the provided web page, registers the access module, and allocates an authentication code and identity (ID) via the registered access module, in which the authentication code can be randomly generated string and the ID can be generated according to the registration order of the access module, the application management module encrypts the randomly generated authentication code using a uniform encryption function and then sends the encrypted authentication code to the access module, the access module stores the encrypted authentication code, and the encrypted authentication code needs to be provided each time the access module and the application management module interact with each other, the application management module decrypts the authentication code by looking up a uniform decryption function corresponding to the uniform encryption function; if the decrypted authentication code is consistent with the authentication code allocated to the access module by the application management module, then the access module passes the verification, and the application management module can receive the information sent by the access module only after the verification of the authentication code is passed successfully; after the access module registers and passes, the application management module will store the authentication code and ID issued to the access module; among them, after the authentication code passes the verification, the application management module can only receive the requests sent by the access module according to the requirements such as delete/modify the authentication code, prolong the service life of the authentication code, download the application and upgrade the application; after having received an request, the application management module can delete and modify the authentication code, can prolong the service life of the authentication code, and can allow the access module to download the application and upgrade the application.

Step 304: the access module receives an input of an Internet of Things terminal, processes the input of the Internet of Things terminal using the application acquired from the application management module, and sends the processed data to a control module.

In particular, the access module receives an input of an Internet of Things terminal, such as camera, infrared, and sound recording; after having received the input of the Internet of Things terminal, the access module sends a request to the application management module, requesting to acquire an application, which request carries the serial number of the application which the access module wishes to acquire, at the same time, the access module sends the authentication code and ID to the application management module, after the application management module has verified the authentication code, the application management module can receive the request sent by the access module for acquiring an application, finds the application corresponding to this serial number in an application list, and sends a plurality of files obtained after processing the application to the access module by way of multimedia messages successively; there is a list preset in the access module, which list stores the Internet of Things terminals connected to the access module and the application to be used for processing the data of each Internet of Things terminal, and the serial number of this application; each time a new application is generated, this list will be updated, the access module can determine the application to be used by the input of the Internet of Things terminal and the serial number corresponding to this application by way of this list and send the serial number to the application management module; the application management module registers when receiving the first request of the access module for acquiring a program from the application management module, afterwards, the registration is no longer required when acquiring a program from the application management module; the access module receives a plurality of files from the application management module, finds a plurality of files with the same theme according to the theme, determines the order of each file in all the files according to the serial number of each file, ranks the files, and finally assembles them into an integrated file, which file is the application, the access module needs to store the allocation authentication code and ID and interacts with the application management module using the authentication code, after the authentication code passes the verification, the application management module can perform operations such as delete/modify the application management module and prolong the service life of the authentication code, the access module can download the application from the application management module and upgrade the application, if the access module cannot provide the authentication code and ID when interacting with the application management module, the operations such as download the application management module and upgrade the application cannot be completed; if after the authentication code passes the verification, the access module requests the application management module to delete the authentication code, then the application management module deletes the authentication code of the access module, if the access module requests the application management module to modify the authentication code, then the application management module allocates a new authentication code to the access module and sends the new authentication code to the access module, and at the same time, the application management module updates the old authentication code;

the access module processes the input of the Internet of Things terminal using the application acquired from the application management module and sends the processed data to the control module in a standard format, with the standard format using strings separated by # sign; for example, as to the application of monitoring area temperature, the access module communicates with the Internet of Things terminal with the function of sensing temperature, the Internet of Things terminal writes the sensed temperature into a file and sends the file to the access module, the access module reads the temperature data from the file using the application ability of reading file in the application acquired from the application management module, which data are embodied in the form of string and separated using # sign or comma and include time, location, and temperature, the substrings are acquired from the string using an algorithm, in this example, only the temperature data are used for judgment, if what is acquired by the Internet of Things terminal is Fahrenheit temperature but what is used locally is centigrade temperature, an algorithm is required to be used to convert the temperature, an organization algorithm is used to organize and sort the temperature data to be sent to form data with certain format which can be received by the control module, then the access module adds an identity into the temperature data and sends the same to the control module, which identity is used for distinguishing the Internet of Things terminal which inputs these data.

Step 305: the control module runs the flow script and invokes the execution module to execute an operation according to the data provided by the access module.

In particular, the control module receives the flow script sent by the service generation module and parses the flow script; since the content in the flow script is an association between icon and icon, the control module cannot read the content of the flow script, the control module finds the class corresponding to this icon in the memory according to the icon of the flow script and assigns the values of the attributes in the label corresponding to this icon to the elements in the class, so that the control module can read the content of the flow script according to the values of the elements in the class, i.e., the service flow described by the flow script; the control module executes the service flow described by the flow script, and at the same time, the control module receives the data sent by the access module, calls an algorithm to process the data, calls the corresponding execution module to execute an operation according to the processed data, in which the processing can be operations such as determination and computation.

For example, as to the application of monitoring the temperature of an area, the control module obtains the Internet of Things terminal which inputs these data according to the identity in the data sent by the access module, determines the current temperature range according to the algorithm corresponding to the call of the Internet of Things terminal, in which the correlation between the Internet of Things terminal and the corresponding algorithm can be preconfigured in the control module; if the temperature data sent by the Internet of Things terminal to the access module indicate that the temperature is above 10 degree and below 20 degree, the control module calls the execution module for starting the air conditioner to start the air conditioner to cool down; if temperature data sent by the Internet of Things terminal to the access module indicate that the temperature is above 20 degree and below 30 degree, then the control module calls the execution module for alerting the administrator, at this moment, the alarm light turns on to alert the administrator that the temperature is above 20 degree; if the temperature data sent by the Internet of Things terminal to the access module indicate that the temperature is above 30 degree, the control module calls the execution module for sounding the alarm, the alarm sounds and the interaction between the control module and the access module together with various execution modules can be implemented by way of instant messaging.

Above description is only to illustrate the preferred embodiments but not to limit the present invention, and any amendments, equivalent substitutions, improvements etc. within the spirit and principle of the present invention are all concluded in the scope of protection of the present invention.

What is claimed is:

1. A system for implementing an Internet of Things service, comprising:
a processor, memory, and one or more program modules stored on the memory, wherein the program modules are configured to be executed by the processor and comprises:
a service generation module, an application generation module, an access module, a control module, an execution module, and an application management module, wherein
the service generation module is used for generating a description script and a flow script according to a required service, sending the description script to the application generation module, and sending the flow script to the control module;
the application generation module is used for generating an application according to the description script and sending the application to the access module;
the access module is used for receiving an input of an Internet of Things terminal, processing the input of the Internet of Things terminal using the application, and sending processed data to the control module, the access module is further used for ranking received binary files according to their serial numbers and assembling the received binary files into a complete file to obtain the application;
the control module is used for running the flow script and calling the execution module to execute an operation according to the data provided by the access module;
the execution module is used for executing an operation according to an invocation by the control module; and
the application management module is connected to the application generation module and the access module, respectively, and is used for receiving the application generated by the application generation module, managing the application, and providing the application to the access module, wherein the providing the application to the access module further includes:
segmenting the application into a plurality of binary files and allocating serial numbers to the binary files sequentially.

2. The system according to claim 1, wherein
the access module is further used for sending a registration request to the application management module and storing an authentication code and an identifier (ID) allocated by the application management module; and
the application management module is further used for registering the access module and allocating the authentication code and the ID to the registered access module.

3. The system according to claim 2, wherein
the access module is further used for requesting the application management module to operate the authentication code based on the authentication code, and/or, requesting to download/upgrade the application; and
the application management module is further used for verifying the access module according to the authentication code, and operating the authentication code after the verification is passed, and/or, allowing the access module to download/upgrade the application.

4. A method for implementing an Internet of Things service, comprising:
an application generation module generating an application according to a description script generated by a service generation module and sending the application to an access module, wherein before sending the application to the access module, the method further comprises: an application management module receiving the application generated by the application generation module and managing the application; the access module sending a registration request to the application management module; the application management module registering the access module and allocating an authentication code and an ID to the registered access module; the access module storing the authentication code and ID allocated by the application management module; and the application management module providing the application to the access module, wherein the application management module providing the application to the access module includes: segmenting the application into a plurality of binary files and allocating serial numbers to the binary files sequentially;
the access module receiving an input of an Internet of Things terminal, processing the input of the Internet of Things terminal using the application, and sending the processed data to a control module, wherein before processing the input of the Internet of Things terminal using the application, the method further comprises: ranking received binary files according to their serial numbers and assembling the received binary files into a complete file to obtain the application; and
the control module running a flow script generated by the service generation module and calling an execution module to execute an operation according to the data sent by the access module; wherein the application generation module, the service generation module, the access module, the control module, and the execution module are program modules stored on a memory, wherein the program modules are configured to be executed by a processor.

5. The method according to claim 4, wherein the method further comprises:
the access module requesting the application management module to operate the authentication code based on the authentication code, and/or, requesting to download/upgrade the application; and
the application management module verifying the access module according to the authentication code, and operating the authentication code after the verification is passed, and/or, allowing the access module to download/upgrade the application.

6. The method according to claim 4, wherein before the application generation module generates an application according to a description script generated by the service generation module, the method further comprises:
the service generation module generating a description script and a flow script according to a required service, sending the description script to the application generation module, and sending the flow script to the control module; wherein the flow script is used for describing a service flow, and the description script is used for describing the application ability of the service.

7. The method according to claim 4, wherein the application generation module generating an application according to the description script generated by the service generation module includes:
   the application generation module performing grammatical analysis of the description script sent by the service generation module, generating an executable code according to a configuration, and invoking a complier to compile the code to obtain an application.

8. The method according to claim 4, wherein the application management module managing the application comprises:
   the application management module receiving the application sent by the application generation module, allocating a serial number to the application, adding an function instruction of the application, and managing the application based on the serial number.

9. The method according to claim 4, wherein before the application generation module generates an application according to a description script generated by the service generation module, the method further comprises:
   the service generation module generating a description script and a flow script according to a required service, sending the description script to the application generation module, and sending the flow script to the control module; wherein the flow script is used for describing a service flow, and the description script is used for describing the application ability of the service.

10. The method according to claim 5, wherein before the application generation module generates an application according to a description script generated by the service generation module, the method further comprises:
    the service generation module generating a description script and a flow script according to a required service, sending the description script to the application generation module, and sending the flow script to the control module; wherein the flow script is used for describing a service flow, and the description script is used for describing the application ability of the service.

11. The method according to claim 4, wherein the application generation module generating an application according to the description script generated by the service generation module includes:
    the application generation module performing grammatical analysis of the description script sent by the service generation module, generating an executable code according to a configuration, and invoking a complier to compile the code to obtain an application.

12. The method according to claim 5, wherein the application generation module generating an application according to the description script generated by the service generation module includes:
    the application generation module performing grammatical analysis of the description script sent by the service generation module, generating an executable code according to a configuration, and invoking a complier to compile the code to obtain an application.

13. The method according to claim 5, wherein the application management module managing the application comprises:
    the application management module receiving the application sent by the application generation module, allocating a serial number to the application, adding an function instruction of the application, and managing the application based on the serial number.

* * * * *